United States Patent [19]

Ikeda et al.

[11] Patent Number: 4,730,223
[45] Date of Patent: Mar. 8, 1988

[54] METHOD OF CONVERTING A DIGITAL DATA SIGNAL HAVING A FIRST LENGTH INTO A DIGITAL DATA SIGNAL HAVING A SECOND LENGTH

[75] Inventors: Shigeyuki Ikeda, Tokyo; Morishi Izumita, Inagi; Seiichi Mita, Kanagawa, all of Japan

[73] Assignees: Hitachi, Ltd; Hitachi Medical Corp., both of Japan

[21] Appl. No.: 742,446

[22] Filed: Jun. 7, 1985

[30] Foreign Application Priority Data

Jun. 8, 1984 [JP] Japan ................... 59-116422

[51] Int. Cl.⁴ .............................. H04N 5/76
[52] U.S. Cl. ..................... 358/335; 358/160; 360/39; 360/40; 360/48; 340/347 DD
[58] Field of Search .......... 358/335, 339, 133, 138, 358/140, 160; 360/39, 40, 48, 55, 32, 33.1, 38.1; 340/347 DD; 371/38

[56] References Cited

U.S. PATENT DOCUMENTS

| | | | |
|---|---|---|---|
| 4,394,762 | 7/1983 | Nabeshima | 371/38 |
| 4,395,738 | 7/1983 | Hedlund et al. | 358/335 |
| 4,517,552 | 5/1985 | Shirota et al. | 340/347 DD |
| 4,531,153 | 7/1985 | Watanabe | 358/141 X |

FOREIGN PATENT DOCUMENTS 3146964  6/1982  Fed. Rep. of Germany .

*Primary Examiner*—Robert L. Richardson
*Attorney, Agent, or Firm*—Antonelli, Terry & Wands

[57] ABSTRACT

A method of converting a digital video signal including first words each being composed of $N_1$ bits into a digital video signal which consists of second words each being composed of $N_2$ bits ($N_2 < N_1$) by separating each of the first words into a first portion which consists of the $N_2$ bits including a most significant bit and a second portion which consists of the remaining ($N_1-N_2$) bits including a least significant bit, and storing the first portions of the first words and the second portions. Third words each of which consists of $N_2$ bits are then composed by sequentially arranging the second portions. A first group of words which represent converted digital image signal are composed by first portions, and a second group of words are composed by sequentially linking the third words. Each scanning line of a converted digital video signal is then composed by the second group of words sequentially arranged before or after the first group of words.

15 Claims, 15 Drawing Figures

METHOD OF CONVERTING A DIGITAL DATA SIGNAL HAVING A FIRST LENGTH INTO A DIGITAL DATA SIGNAL HAVING A SECOND LENGTH

The present invention relates to a data conversion method between image processing systems of different data structures, and more particularly to a method by which a video signal digitized with a number $N_1$ of bits for quantization is converted into a video signal digitized with a number $N_2$ ($N_2 < N_1$) of bits for quantization.

In recent years, imaging systems for medical diagnoses equipped with computers have come into use, and picture data for diagnoses has been increasingly digitized. While CT (computed tomography) etc. for handling still pictures was developed at first, DSA (digital subtraction angiography) etc. for handling moving pictures has recently been developed. In the DSA etc., a diagnostic image is converted into a video signal by a television camera, and this signal is digitized. Further, the resulting data are subjected to various digital image processing steps by a computer. Such systems have been enabled to produce pictures effective for diagnoses owing to various digital processes, but a method of recording the pictures in the form of digital signals is needed. The still pictures as in the CT can be recorded on an MT (magnetic tape), a floppy disk etc. accessory to computers. In case of the moving pictures, however, 30 still pictures need to be recorded for each second, therefore, the rate of recording data is 100 megabits or more per second, requiring very high speed processing and large capacity storage. At present, therefore, the digital data are restored into analog signals, which are recorded in an analog VTR (video tape recorder) or VDR (video disk recorder). This has led to the problem that the pictures degrade in quality each time they are recorded and reproduced. Digital VTRs and large-capacity optical disks have been developed in these several years. Since, however, they ae not for medical purposes, most of them perform processing in 8-bit units. Quantization in 8 bits is unsatisfactory for the picture resolution for a diagnosis, and quantization in at least 9 bits is necessary for attaining a good resolution (discriminating performance). Quantization in 9 bits or 10 bits has been provided by prior art devices, but complicated data conversion is required for recording data in the digital VTR or the like, resulting in the problem that a circuit therefor is large in scale and expensive. In the field of digital signals, a set of N bits which represents the value of one sample, namely, the information of one pixel in case of a picture signal is called a "word".

An object of the present invention is to provide a method according to which a video signal digitized with a certain number of bits for quantization is converted into a signal of a smaller number of bits for quantization.

Another object of the present invention is to provide a data conversion method according to which digital image data of a video signal system whose number of bits for quantization is not smaller than 9 bits can be recorded and reproduced by an image recorder, e.g., digital VTR whose number of bits for quantization is 8 bits.

The objects of the present invention are accomplished by a signal conversion method wherein a digital video signal which consists of a plurality of first words each being composed of $N_1$ bits representing a value of one sample is converted into a digital video signal which consists of a plurality of second words each being composed of $N_2$ ($N_2 < N_1$) bits representing a value of one sample. The conversion method includes the step of dividing each of the first words corresponding to one scanning line into a first portion which consists of the $N_2$ bits including an MSB (most significant bit) and suceeding bits, and a second portion which consists of the remaining ($N_1-N_2$) bit or bits including an LSB (least significant bit); the step of collecting the $N_2$ bits of the second portions of the first words so as to create a group of the second words from a group of the second portions of the first words; the step of arranging the group of the second words created from the group of the second portions of the first words at a beginning part or an end part of a picture signal period in one horizontal scanning period, and also arranging a group of the first portions of the first words at the remaining part of the picture signal period.

In the drawings:

FIGS. 2A, 2B and 2C illustrate data rearrangement methods, in which

Figure 1:
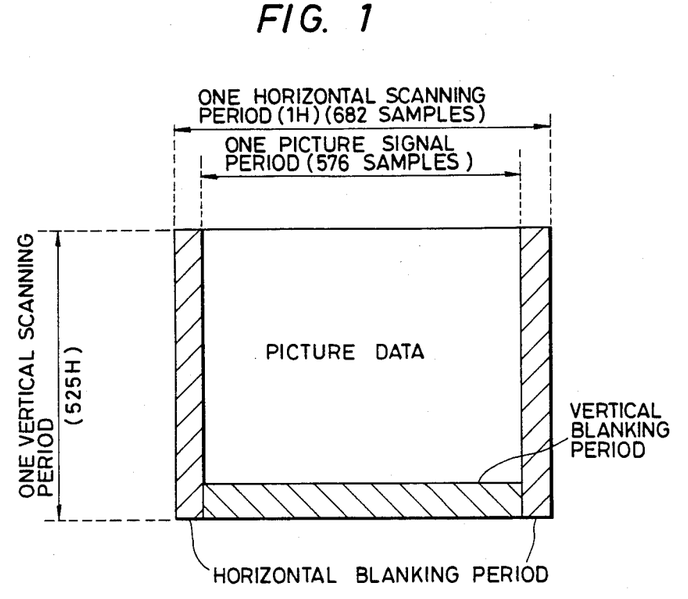
FIG. 1 is a diagram of the video data construction of the NTSC format.
Figure 2A:
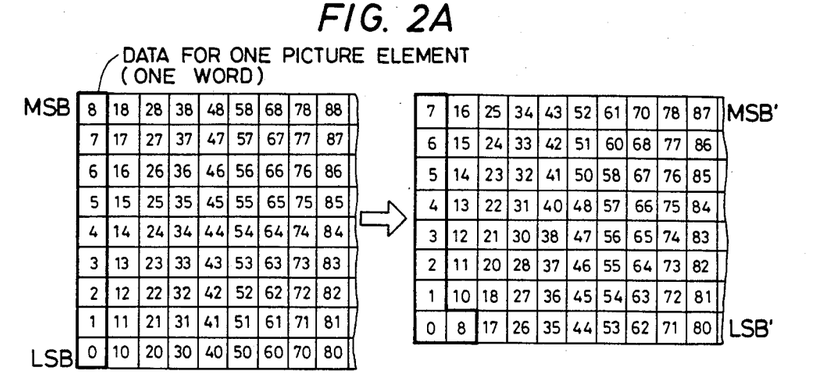
FIG. 2A is a diagram showing a sequential rearrangement method.
Figure 2B:
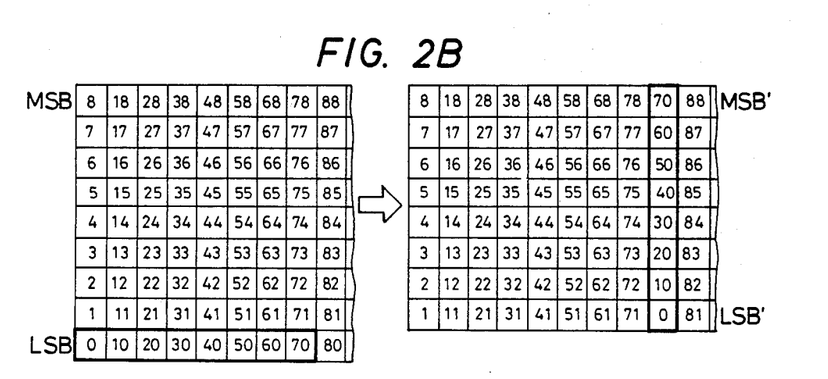
FIG. 2B is a diagram showing an 8-pixel-unit rearrangement method.
Figure 2C:
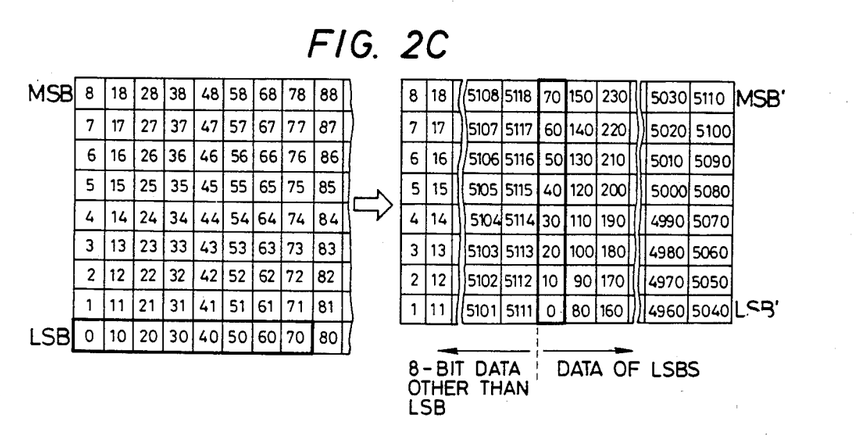
FIG. 2C is a diagram showing a 1H-unit rearrangement method according to the present invention.
Figure 3:
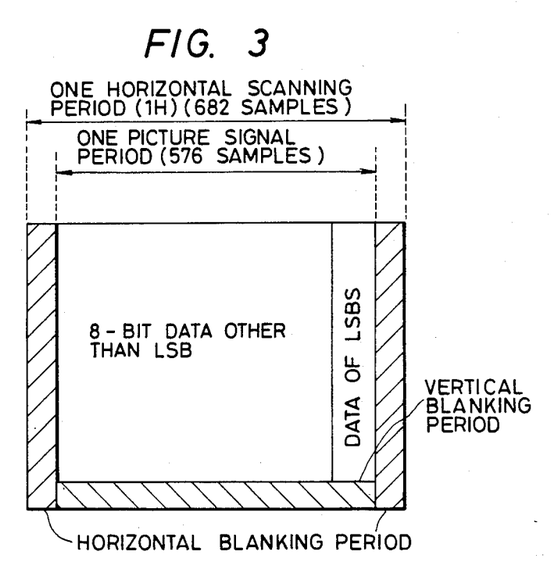
FIG. 3 is a diagram of a video data construction based on the 1H-unit rearrangement method.

Referring to FIGS. 1 to 3, the principle of the present invention will be described.

The television picture of the NTSC format (the system in which the luminance signal and color difference signals are produced from three primary color signals) has a data construction as shown in FIG. 1. One horizontal scanning period (which is the period of time from the start of a certain scanning line to the start of the next scanning line, and which shall hereinbelow called "1H") is composed of a picture signal period and a horizontal blanking period, and there is an effective picture data portion in the picture signal period. One frame is the total of a vertical tracing period and a vertical blanking period, and is made up of 525 scanning lines. The sampling frequency of quantization in the case of subjecting the data to analog-to-digital conversion is set to an integral times the frequency $f_{sc}$ (3.58 MHz) of a color burst signal in order to facilitate signal processing. When the data are sampled at three times the frequency $f_{sc}$, the number of effective data per scanning line becomes 576. On the other hand, as regards the picture data of the DSA etc., the number of data samples of one scanning line is 512 (9-bit) samples so as to facilitate computer processing. Accordingly, when the data are sampled at 3 $f_{sc}$, there is a margin of 64 samples relative to the 576 sample points, and 1-bit data in the 9-bit data are rearranged and are written into the margin, whereby the data of 9 bits can apparently be converted into 8-bit data. As methods of converting the 9-bit data into 8 bits as described above, the inventors have considered the three methods as illustrated in FIGS. 2A, 2B and 2C. These methods will be explained with reference to FIGS. 2A, 2B and 2C. FIG. 2A shows a sequential rearrangement method. 9-bit data representing the first pixel (one word composed of nine bits) are denoted by 0, 1, 2, 3, 4, 5, 6, 7 and 8 from the LSB (0 is the LSB, and 8 is the MSB). Likewise, the 9-bit data of the second to 512th pixels are denoted by 10, 11, 12, 13, 14, 15, 16, 17 and 18, . . . and 5110, 5111, 5112, 5113, 5114, 5115, 5116, 5117 and 5118. The method in which the 9-bit data are partitioned every 8th bit to be rearranged into 8-bit data is the sequential rearrangement method. Next the most significant bit (MSB) 8 of the first pixel is rearranged and the least significant bit (LSB) 10 of the second pixel is arranged. Since, with this method, all the bits are rearranged, the correlations of the individual pixels are hardly involved before and after the rearrangement. Accordingly, even when the 8-bit data after the rearrangement are subjected to digital-to-analog conversion and then displayed on a monitor screen for the purpose of, e.g., the inspection of circuitry, only an insignificant display is disadvantageously provided. FIG. 2B shows an 8-pixel-unit rearrangement method. It is a method wherein 9-bit data denoted as in FIG. 2A are partitioned into 8-pixel units, with eight LSBs 0, 10, 20, 30, 40, 50, 60 and 70, for example, being rearranged similar to the 8-bit data of one pixel (one word composed of eight bits), and the 8-bit data are added as the data (word) of, for example, the 9th pixel next to the data (word) of the 8th pixel. Since this method does not perform the upper←→lower bit rearrangement of the upper 8-bit data, the data of the upper 8 bits are protected. Since, however, it performs the rearrangement in the scanning line direction, it has the disadvantage that when the rearranged data are displayed on a monitor screen, a pixel having no correlation, namely noise, appears every 9th pixel, resulting in a display fairly different from the original picture.

FIG. 2C shows a 1H-unit rearrangement method according to the present invention. The 9-bit data of 512 pixels denoted as in FIGS. 2A and 2B are partitioned every 8th pixel and the data of one pixel are created from eight LSBs as in the 8-pixel-unit rearrangement method. This procedure is applied to all the 512 pixels, to prepare 64 sets of 8-bit data composed of LSBs. Next to the data 5111, 5112, 5113, 5114, 5115, 5116, 5117 and 5118 of the 512th pixel from which the LSB 5110 has been removed, there are added the 64 sets of data from the set composed of the LSBs 0, 10, 20, 30, 40, 50, 60 and 70 to the set composed of the LSBs 5040, 5050, 5060, 5070, 5080, 5090, 5110 and 5110.

The set of nine bits representing one pixel and the set of eight bits shall be respectively named the "first word" and the "second word", and the method of the present invention will be elucidated using these terms.

All the pixels on one scanning line, numbering 512, can be expressed by 512 first words. The LSBs are respectively separated from the 512 first words. The LSBs of eight first words are used to create one third word having the same number of bits as a second word. That is, every eight separated LSBs are collected to form a single third word. Since the separated LSBs exist by 512 for each scanning line, 64 third words are created. The 512 first words with their respective LSBs removed therefrom become 512 second words as they are. The 64 third words created from the LSBs of the first words are successively arranged next to the last pixel on the scanning line, namely, next to the 512th second word and are therefore equivalent to the second words.

A diagram of the data construction of one frame according to this method is shown in FIG. 3. Since, with this method, the upper 8 bits are subjected to neither the upper←→lower bit rearrangement nor the rearrangement in the scanning line direction, they are protected. When these data are displayed on a monitor screen as shown, a display having no correlation is provided at the right end of the screen, but a picture reconstructed of the 8 bits without the LSBs is displayed, and hence, the picture which is very similar to the picture of 9 bits is displayed. Accordingly, this method is much more advantageous than the other two methods in the retrieval of pictures.

The 64 third words created from the LSBs of the first words may well be arranged before the first pixel on the scanning line, namely, before the first second word. In this case, the LSB data portion is displayed at the left end of the frame in FIG. 3.

Figure 4A:
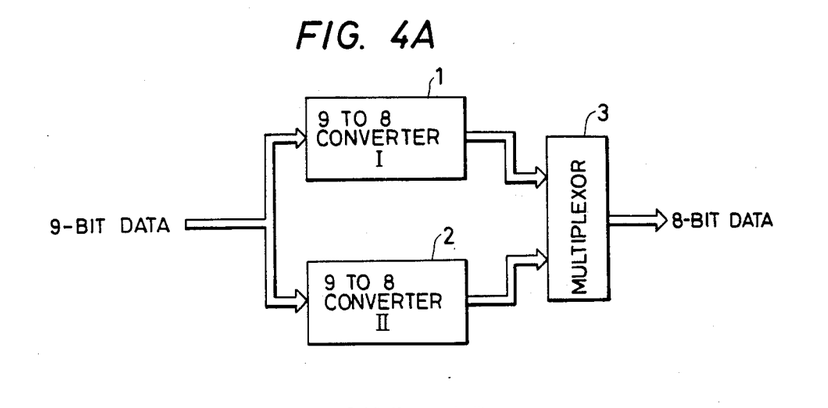
FIG. 4A is a block dagram of a 9-bit to 8-bit rearrangement circuit.
Figure 4B:
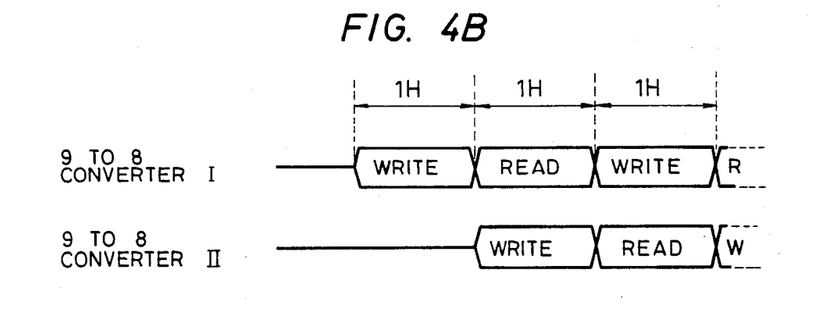
FIG. 4B is a timing chart of the circuit.

Now, one embodiment of the present invention will be described as to systems whose numbers of bits for quantization are 8 and 9 respectively, the system of 8 bits having a sampling frequency of 3 $f_{sc}$, with reference to FIGS. 4A and 4B, FIGS. 5A, 5B and 5C, FIGS. 6A and 6B and FIGS. 7A, 7B and 7C. FIG. 4A is a block diagram of a 1H-unit rearrangement circuit for performing the present invention. The rearrangement circuit is constructed of two 9-bit to 8-bit conversion circuits (hereinafter, simply written "9 to 8 conversion circuits") 1 and 2 and a multiplexor 3, and it writes 9-bit data into the two 9 to 8 conversion circuits alternately every period of 1H. The 9 to 8 conversion circuit which is not in a write operation cycle reads data, and delivers the 8-bit data in real time through switching by the multiplexor. FIG. 4B shows a timing chart of the two 9→8 conversion circuits. Each of the circuits executes the writing and reading at intervals of 1H.

Figure 5A:
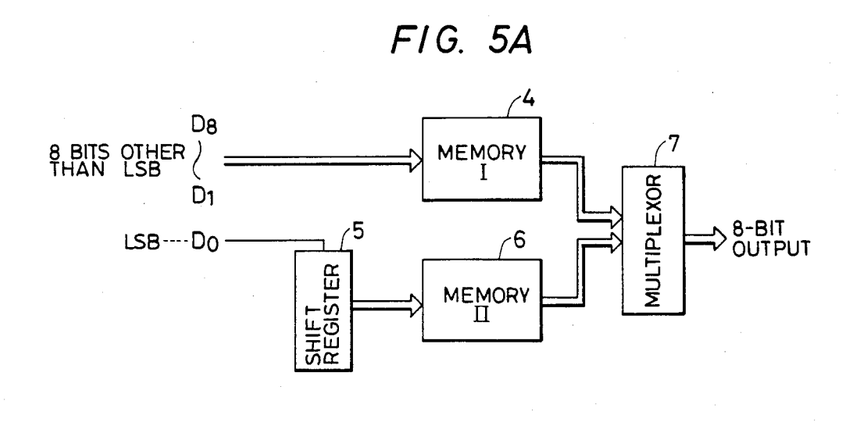
FIG. 5A is a block diagram of a 9-bit to 8-bit conversion circuit.
Figure 5B:
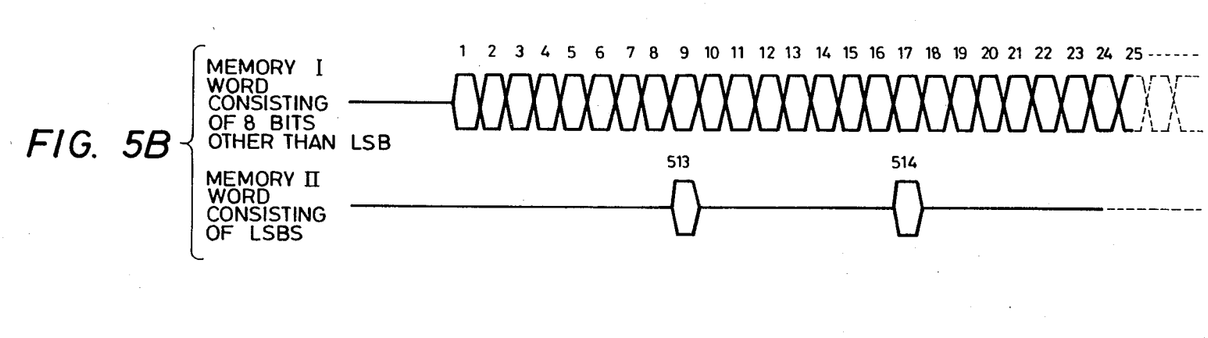
FIG. 5B is a timing chart related to the writing of the circuit.
Figure 5C:
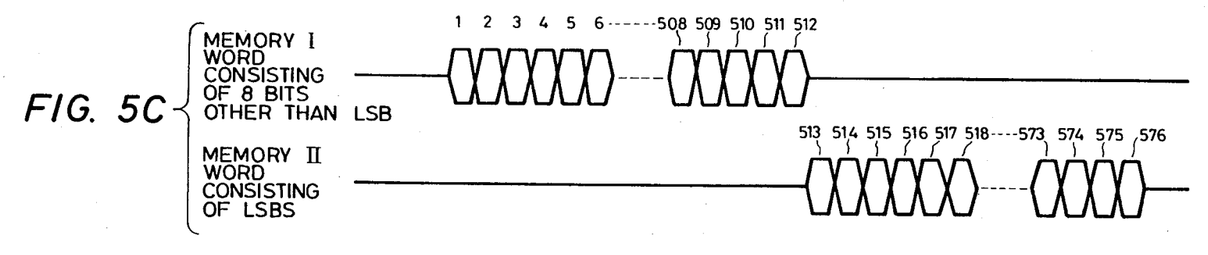
FIG. 5C is a timing chart related to the reading of the circuit.

Shown in FIG. 5A is a block diagram of the 9 to 8 conversion circuit mentioned above. With the conversion circuit, the upper 8 bits in the 9-bit data are written into a first memory 4, and the LSBs corresponding to eight pixel data are rearranged into the data of one pixel or into one word by the use of an 8-bit shift register 5, the word being thereafter written into a second memory 6 as the data of the 513th pixel. These operations are repeated for the data of 512 pixels corresponding to 1H, to perform the writing. The reading is performed during the next period of 1H. The data of the upper 8 bits corresponding to the 512 pixels are first read out, and the 1-word data composed of the LSBs and numbering 64 are subsequently read out, whereby the 9 to 8 conversion is provided. FIGS. 5B and 5C show timing charts of the first and second memories 4 and 6. FIG. 5B illustrates write timings. The second memory 6 writes the data once for the eight words of the first memory 4. FIG. 5C illustrates read timings. The second memory 6 begins to read out the data after the first memory 4 has read out the 512 data. In such a sequence, the data of the first and second memories are read out through switching by a multiplexor 7.

Figure 6A:
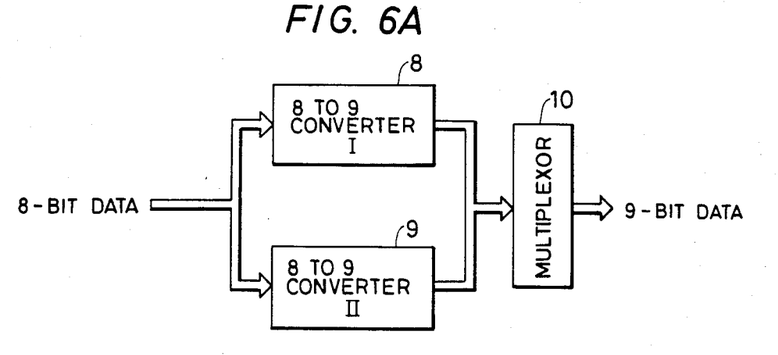
FIG. 6A is a block diagram of an 8-bit to 9-bit rearrangement circuit.
Figure 6B:
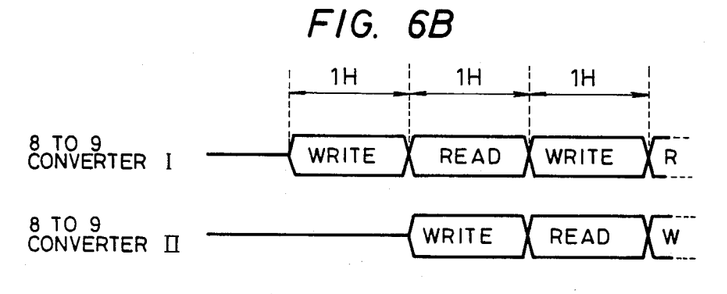
FIG. 6B is a timing chart of the circuit.
Figure 7A:
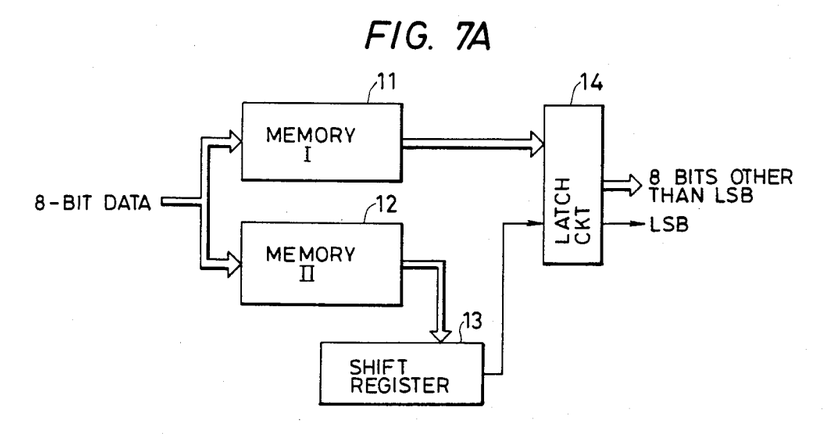
FIG. 7A is a block diagram of an 8-bit to 9-bit conversion circuit.
Figure 7B:
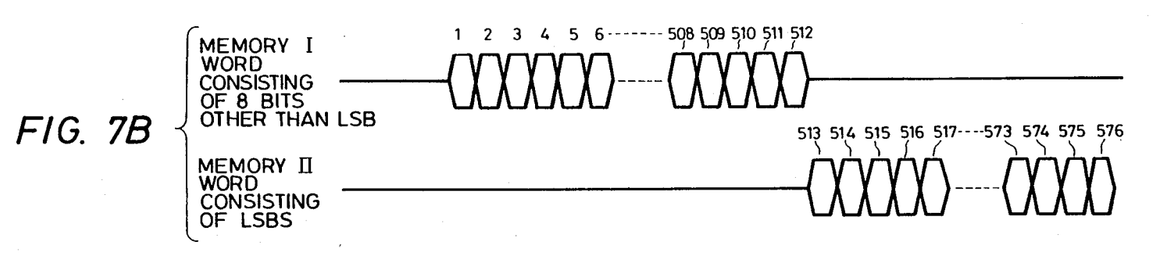
FIG. 7B is a time chart of the writing of the circuit.
Figure 7C:
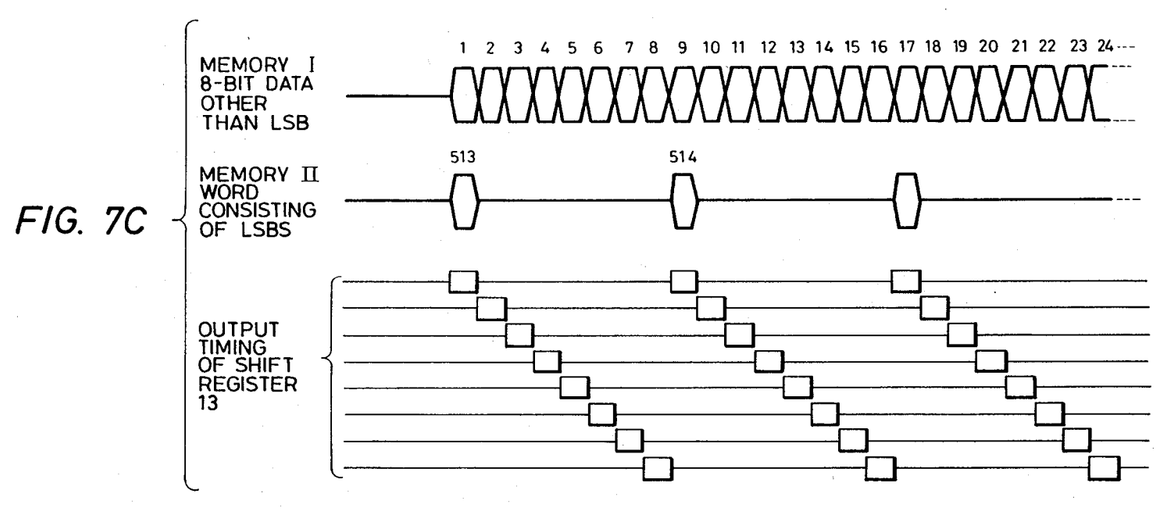
FIG. 7C is a timing chart of the reading of the circuit.

Next, an 8-bit to 9-bit rearrangement circuit for restoring the rearranged 8-bit data into the 9-bit data will be explained. FIG. 6A is a block diagram of the circuit. The circuit is constructed of two 8-bit to 9-bit conversion circuits (hereinafter, simply written "8 to 9 conversion circuits") 8 and 9 and a multiplexor 10, and it executes the writing and reading of data alternately every period of 1H in a manner similar to the 9-bit to 8-bit rearrangement. A timing chart of the writing and reading is shown in FIG. 6B. The timing chart is similar to that of FIG. 4B. Shown in FIG. 7A is a block diagram of the 8 to 9 conversion circuit. The initial 512 words in the 576 words of 1H subjected to the 9 to 8 conversion are the data for the upper 8 bits. These 512 data are written into a first memory 11. Next, the subsequent 64 words composed of the LSBs are written into a second memory 12, and the writing of the data of 1H ends. In the next period of 1H, these data are read out. First, the data of one word composed of the LSBs are read out from the second memory 12 and are subjected to parallel—serial conversion by an 8-bit shift register 13. Subsequently, the upper 8-bit data corresponding to each of the eight LSBs are read out from the first memory 11 and are latched by a latch circuit 14. Thus, the 9-bit data can be restored. FIG. 7B illustrates the write timings of the first and second memories 11 and 12. When the writing of the upper 8-bit data has ended, the writing of the LSB data begins. FIG. 7C illustrates read timings. The reading of the 1-word data of the LSBs is executed once for eight reading operations of the upper 8-bit data, the parallel-to-serial conversion is carried out in accordance with the output timing of the shift register depicted in FIG. 7C, and each of the eight LSBs is added to the corresponding upper 8-bit data, whereby the 9-bit data can be restored. In the above way, the systems whose numbers of bits for quantization are 9 and 8, respectively, are permitted to be connected.

The connection between the system of 8 bits and a system whose number of bits for quantization is 10 or more can be realized in such a way that, the LSB data, the data of the second-lowest, third-lowest . . . bits similarly rearranged are located in succession. By way of example, in a case where the sampling frequency of quantization is 4 $f_{sc}$, a system of at most 12-bit data and the system of 8-bit data can be connected.

According to the present invention, digital data of a video signal system of 9 bits or more can be recorded and reproduced by a digital data recorder of 8 bits (such as a digital VTR or a large-capacity optical disk).

The present invention makes it possible to record and reproduce, for example, diagnostic picture data as digital signals by means of the digital data recorder of 8 bits. Accordingly, image processing can be performed by a computer or the like without decreasing the quality of a picture, and various image processing techniques can be effectively applied to the diagnostic picture data. As is apparent from the foregoing description, it is also possible to utilize a data recorder as described herein which is not for exclusive medical purposes.

What is claimed is:

1. A signal conversion method wherein a digital video signal which includes first words each including $N_1$ bits representing a value of one sample in a video image is converted into a digital video signal which includes second words each including $N_2$ bits ($N_1$ and $N_2$ being integers and $N_2 < N_1$) representing a value of one sample, comprising the steps of:

separating each of said first words corresponding to each of a plurality of scanning lines into a first portion which includes said $N_2$ bits including a most significant bit and a second portion which includes the remaining ($N_1-N_2$) bits including a least significant bit;

storing said first portions of said first words in a first memory means;

composing third words, each of which includes $N_2$ bits, by sequentially arranging at least one of said second portions of said first words;

storing said third words in a second memory means;

composing a first group of words by sequentially arranging said first portions of said first words stored in said first memory means;

composing a second group of words by sequentially arranging said third words; and composing a converted digital video signal corresponding to one scanning line by sequentially arranging said second group of words before said first group of words.

2. A signal conversion method according to claim 1, further comprising the step of:

displaying an image comprised of a plurality of said first groups of words, each of said first groups of words being contained in said converted digital video signal.

3. A signal conversion method according to claim 1, wherein each said first word is composed of at least 9 bits, and each said second word is composed of at least 8 bits.

4. A signal conversion method according to claim 1, wherein the steps of composing a first group of words and storing said first portions of said first words are executed simultaneously.

5. A signal conversion method according to claim 1, wherein the steps of composing said third words and arranging said second portions of said first words are executed simultaneously.

6. A signal conversion method according to claim 1, further comprising the step of:

recording said converted digital video signal onto a recording medium in a video signal recorder.

7. A signal conversion method according to claim 6, wherein said video signal recorder is one of a video tape and disk recorder designed so as to record and reproduce said converted digital video signal with words composed of 8 bits.

8. A signal conversion method wherein a digital video signal which includes first words each including $N_1$ bits representing a value of one sample in a video image is converted into a digital video signal which includes second words each including $N_2$ bits ($N_1$ and $N_2$ being integers and $N_2 < N_1$) representing a value of one sample, comprising the steps of:

separating each of said first words corresponding to each of a plurality of scanning lines into a first portion which includes said $N_2$ bits including a most significant bit and a second portion which includes of the remaining ($N_1-N_2$) bits including a least significant bit;

storing said first portions of said first words in a first memory means;

composing third words, each of which includes $N_2$ bits, by sequentially arranging at least one of said second portions of said first words;

storing said third words in a second memory means;

composing a first group of words by sequentially arranging said first portions of said first words stored in said first memory means;

composing a second group of words by sequentially arranging said third words; and composing a converted digital video signal corresponding to one scanning line by sequentially arranging said second group of words after said first group of words.

9. A signal conversion method according to claim 8, further comprising the step of:

displaying an image comprised of a plurality of said first groups of words, each of said first groups of words being contained in said converted digital video signal.

10. A signal conversion method according to claim 8, wherein each said first word is composed of at least 9 bits, and each said second word is composed of at least 8 bits.

11. A signal conversion method according to claim 8, wherein the steps of composing a first group of words and storing said first portions of said first words are executed simultaneously.

12. A signal conversion method according to claim 8, wherein the steps of composing said third words and arranging said second portions of said first words are executed simultaneously.

13. A signal conversion method according to claim 8, further comprising the step of:

recording said converted digital video signal onto a recording medium in a video signal recorder.

14. A signal conversion method according to claim 13, wherein said video signal recorder is one of a video tape and disk recorder designed so as to record and reproduce said converted digital video signal with words composed of 8 bits.

15. A signal conversion method wherein a digital video signal which includes first words, each including $N_1$ bits representing a value of one sample in a video image is converted into a digital video signal which includes second words each including $N_2$ bits ($N_1$ and $N_2$ being integers and $N_2 < N_1$) representing a value of one sample, comprising the steps of:

separating each of said first words corresponding to each of a plurality of scanning lines into a first portion which includes said $N_2$ bits including a most significant bit and a second portion which consists of the remaining ($N_1-N_2$) bits including a least significant bit;

storing said first portions of said first words in a first memory means;

storing said second portions of said first words in a second memory means;

composing third words, each of which includes $N_2$ bits, by sequentially arranging at least one of said second portions of said first words;

composing a first group of words by sequentially arranging said first portions of said first words stored in said first memory means;

composing a second group of words by sequentially arranging said third words; and composing a converted digital video signal corresponding to one scanning line by sequentially arranging said second group of words one of before and after said first group of words.

* * * * *